United States Patent [19]

Lathrop

[11] Patent Number: 5,524,720
[45] Date of Patent: Jun. 11, 1996

[54] POWERED WALKER HAVING INTEGRATED PARALLEL BARS

[76] Inventor: John Lathrop, 66 Fairmont Ave., #103, Oakland, Calif. 94611

[21] Appl. No.: 293,390

[22] Filed: Aug. 19, 1994

[51] Int. Cl.⁶ .................................................. B60K 1/00
[52] U.S. Cl. ........................................... 180/19.2; 180/214
[58] Field of Search .................................... 180/19.1, 19.2, 180/19.3, 11, 12, 13, 210, 211, 213, 214, 907

[56] References Cited

U.S. PATENT DOCUMENTS

| | | | |
|---|---|---|---|
| 3,872,945 | 3/1975 | Hickman et al. | 180/65.6 |
| 4,280,578 | 7/1981 | Perkins | 180/6.5 |
| 4,463,817 | 8/1984 | Mennesson | 180/65.5 |
| 4,750,578 | 6/1988 | Brandenfels | 180/214 X |
| 4,802,542 | 2/1989 | Houston et al. | 180/65.5 |
| 5,168,947 | 12/1992 | Rodenborn | 180/19.1 |
| 5,224,562 | 7/1993 | Reed | 180/6.5 |
| 5,390,753 | 2/1995 | Parker | 180/19.1 |

FOREIGN PATENT DOCUMENTS

| | | | |
|---|---|---|---|
| 2915387 | 10/1980 | Germany | 180/214 |
| 2109321 | 6/1983 | United Kingdom | 180/907 |
| 93/14968 | 8/1993 | WIPO | 180/214 |

*Primary Examiner*—Kevin T. Hurley
*Attorney, Agent, or Firm*—Michael A. Glenn

[57] ABSTRACT

An integrated powered walker and parallel bar that provides a stable and mobile walking frame for those who must pull on objects is adapted to move forward according to a user's needs. The user controls movement of the walker by depressing a switch; the speed at which the device moves is also user controlled.

7 Claims, 5 Drawing Sheets

5,524,720

POWERED WALKER HAVING INTEGRATED PARALLEL BARS

BACKGROUND OF THE INVENTION

TECHNICAL FIELD

The present invention relates to powered walker devices for assisting handicapped individuals to move about in an upright position. More particularly, the present invention relates to a powered walking aid that combines a walker, parallel bars, and adaptable controls and handles for different degrees of user coordination.

DESCRIPTION OF THE PRIOR ART

Wheelchairs of various types and designs have been used for a considerable period of time for the purpose of transporting physically disabled individuals who have limited or no use of their legs. Wheelchair designs have become quite sophisticated as a result of efforts intended to enable disabled individuals to have a degree of control over their own movements. A major disadvantage of wheelchairs in general is that such devices, while assisting disabled individuals in moving about an area, restrict such individuals to a relatively rigid sitting position within the chair that causes continual pressure and contact on the same areas of the body, and may lead to such complications as skin and tissue degeneration.

Additionally, wheelchairs afford the disabled individual little opportunity for realistic physical activities. For example, children who have cerebral palsy are generally put in a wheelchair when they become too heavy to carry, and they become too old for their crawling to be socially acceptable. This attitude overlooks the fact that the human body is a machine designed to move, not simply sit. Such lack of motion has a negative impact on total functioning and development of the child's body, mental outlook, and social development.

Walker devices were designed to overcome some of the aforementioned problems associated with wheelchairs. It is known that devices that enable a disabled individual to remain in a standing position for relatively long periods of time, e.g. two or more hours at a time, provide substantial advantages and benefits to the disabled individual. More particularly, passive standing produces beneficial physiological effects that include the reduction of bone and calcium loss, reduction of hypercalciuria and urinary calculi, increased muscular tone and maintenance of range of motion, improved orthostatic circulatory regulation, and increased bladder pressure.

Additionally, substantial psychological benefits results from permitting physically disabled individuals to remain in a standing position. Such standing positions provide increased independence and morale as well as permit the disabled person to position himself to work at various work stations. As a result, walker devices of various types have been developed to permit the disabled individual to remain in the standing position for a period of at least several hours.

Walker devices present a number of problems that are not encountered in wheelchairs designs. Such problems arise in part from the fact that a user's body extends substantially above the center of gravity of the walker. Accordingly, walkers have been prone to tipping over. If a walker is made with a relatively large base area to avoid the tipping problem, maneuverability of the walker is restricted. Additionally, it becomes more difficult to provide support for the user of the walker.

Early walker devices, such as illustrated in U.S. Pat. Nos. 2,168,424, 2,708,473, and 3,354,893, are useful, although they have numerous problems and deficiencies. Most particularly, such devices require the disabled person to use his own muscular arm power to maneuver the device about a room or over a flat surface. Thus, the usefulness of such devices is dependent upon the physical capability, strength, and coordination of the user.

Powered walker devices were developed to overcome the aforementioned deficiency. Such powered walker devices, which are typically powered by an electric motor and a battery, enable the user to stand within the walker and maneuver and move about an area, even though the individual has limited strength or limited use of his arms. See, for example Hickman, U.S. Pat. No. 3,872,945 (powered walker); J. Perkins, U.S. Pat. No. 4,280,578 (powered walker having an open-bottomed framework that allows a user to take steps while using the device); Houston et al, U.S. Pat. No. 4,802,542 (powered walker including an integral seat); Rodenborn, U.S. Pat. No. 5,168,947 (powered walker including a base upon which a user may stand); and Reed, U.S. Pat. No. 5,224,562 (powered walking aid including independently driven wheels and means for selectively controlling each of said wheels).

A problem is often encountered when a disabled individual makes the transition from the use of parallel bars in physical therapy to the use of a walker. Parallel bars provide secure and immovable support for the individual, whereas a walker is made for movement. Consequently, the walker is a less stable source of support which may move or tip over when the inexperienced individual's weight is brought to bear n it. As a partial solution, an individual in physical therapy may be able to walk using parallel bars, or anywhere else where a hand rail is available. It is sometimes the case that a disabled individual installs hand rails throughout their residence to provide mobility in that environment. The drawback with hand rails is that they only are available in fixed locations. Thus, while hand rails are a solution, few individuals could accept or afford placing hand rails everywhere.

During parallel bar therapy, it is not unusual that countless attempts are made to progress a disabled person from parallel bars to a standard walker. However, these efforts often fail because the walker is not designed for the user to pull up on it. This is a problem for individuals such as those persons having cerebral palsy, who have a natural tendency to pull up on objects. This is like a toddler, who must pull on something when first walking.

Many physical therapists have recognized that it is unnatural for such disabled individuals to push down on the walker. Trying to train one with cerebral palsy not to pull on things is like trying to teach a person without cerebral palsy to walk always on his toes. Because a standard walker tips over if pulled on, a conventional walker is the wrong tool for such individuals. Therefore, weights have been added to the walker to provide needed resistance. The weights allow the disabled individual to stand with the walker. Unfortunately, the weights make it impossible for the handicapped individual to move the walker.

People who have cerebral palsy can often thrust themselves backward in a manual wheelchair because they have some leg movement and strength, but they lack the coordination needed to walk. As discussed above, a walker forces such people to use motor skills that are counter to their natural motions. This further impairs their balance, and increases their frustration and despair of adapting to, and overcoming, their disability. Too much time is wasted trying to make the person fit the limitations of a walker that was not designed for their condition or abilities. The problem is not the person or the walker: it is the mismatch between them.

SUMMARY OF THE INVENTION

The invention is designed for those individuals suffering from such neurological problems as cerebral palsy, stroke victims, those having some stages of multiple sclerosis, and traumatic injury patients. The inventor himself has cerebral palsy, and has made the invention herein based on the user's perspective. The invention allows a user to engage in rehabilitative and therapeutic exercises, while performing the activities of normal living. The invention is especially beneficial for those disabled individuals who can not progress beyond parallel bars. For example, the invention provides a power walker for a person in physical therapy that is used as a portable parallel bar to aid the transition from a parallel bar to a walker. The invention provides the stability of hand rails with the mobility of a walker. While other powered walkers are known (see the discussion above), none address the stability needs, coordination patterns, and mobility needs of disabled individuals, such as those with cerebral palsy.

The preferred embodiment of the invention provides an integrated powered walker and parallel bar. The walker includes a stable and mobile walking frame for those who must pull on objects, and is adapted to move forward according to a user's needs. The user controls movement of the walker by depressing a switch; the speed at which the device moves is also user controlled.

DETAILED DESCRIPTION OF THE INVENTION

The invention provides a device that integrates a powered walker and parallel bars to assist disabled individuals, e.g. those with such debilitating illnesses as cerebral palsy, to move about in an upright position and to walk. The invention provides a cost effective tool that allows many individuals having neurological limitations to learn or regain their ability to walk. The invention was made with the view that the only true disability of such diseases as cerebral palsy is not having the proper tools to meet the disabled individual's requirements and coordination patterns. The invention provides a tool to fulfill one such need.

The invention provides an integrated powered walker and parallel bar. The walker is adapted to move forward according to the user's needs. The user controls movement of the walker by depressing a switch. The speed at which the device moves is adjustable from zero to about one mile per hour or more by means of a speed control. A user may change the speed of the walker as he walks, although in many applications the user may find a comfortable walking speed at which the walker is consistently maintained.

Figure 1:
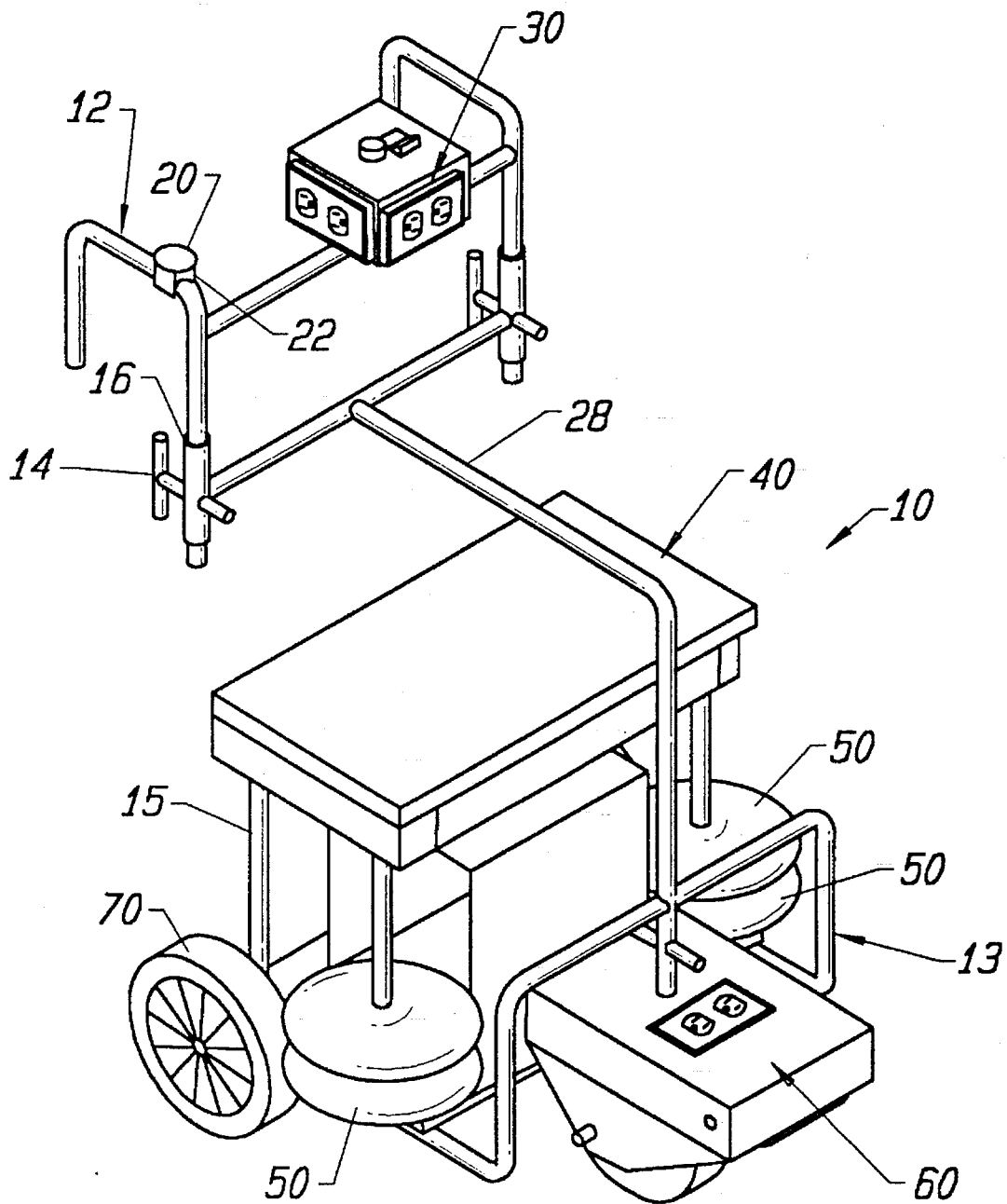
FIG. 1 is a perspective view of a powered walker device having an integrated parallel bar according to the present invention.

FIG. 1 is a perspective view of a powered walker device having an integrated parallel bar according to the present invention. The walker 10 includes a unique handle grip 12 having a support cross bar 18 and having an attachment point 16 by which the grip is secured to a first frame section 26 by a pair of pins 14. The grip attachment point comprises a series of spaced apertures (not shown) that allow the height of the grip to be adjusted by removing the pins, repositioning the grip, and then reinserting the pins. The shape of the grips allows each person to grab the grips in a position that is most natural position for the person. The grip also includes a motion control switch 20 that is secured to the grip by a switch bracket 22, and includes a control box assembly 30. The grips are configured as parallel bars that are adjustable in height and that are attached to the mobile platform. Thus, the invention provides a moving parallel bar.

The first frame section may be made of 1-inch pipe, and include an attachment means (discussed below) that joins the first frame section to a second, base frame section 13. The base section provides a platform that has an extremely low center of gravity and weighs approximately 200 pounds. The combination of weight and low center of gravity provided by the invention makes it nearly impossible to tip over the walker. It should be appreciated that the actual weights and dimensions herein are provided for purposes of example and that many different configuration of the invention are possible.

The base frame includes a series of upwardly projecting arms that support a plurality of weights 50. The amount of weight can be adjusted to match the needs of each person using the device. In the exemplary embodiment of the invention, the weights are standard 5-pound bar bell weights, such as are available at any sporting goods store. The base frame also includes a drive assembly 60 which provides a motive source and a first of three wheels. The drive assembly is movably coupled to the grip via the first frame section 26 such that a user steers the invention by displacing the grip to the left or the right, thereby repositioning the drive assembly and redirecting the walker as desired.

Two rear wheels 70, which may be standard 8-inch wagon wheels rotatably affixed to a ¼-inch axle, provide a large wheel base that, in conjunction with the weights, ensures that the walker has a highly stable configuration that is well suited for the special needs of disabled persons, such as those who have cerebral palsy. The base frame also supports a platform 40 having a flat surface that is adapted to provide a table or a seat.

A tri-wheel configuration is employed in the preferred embodiment of the invention to eliminate the need for an expensive differential. The motor is on the front wheel. This simplifies control and operation of the invention, e.g. it is easier to steer in this configuration. It is important to note and of some significance that, in contrast to the currently available powered walker devices which require two-hand controls, the invention may be operated with one hand. This is significant because using two hands is an impossible task for many persons with such disabilities as cerebral palsy. The invention also provides a built-in table/seat.

Figure 2:
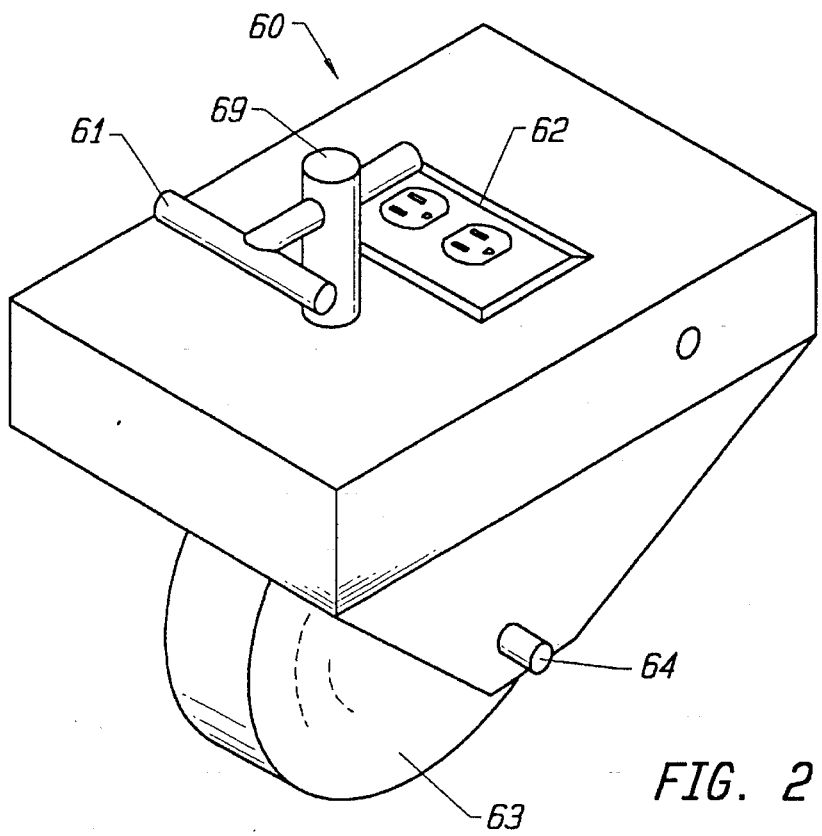
FIG. 2 is a first perspective view of a drive assembly for a powered walker device having an integrated parallel bar according to the present invention.

FIG. 2 is a first perspective view of a drive assembly 60 for a powered walker device having an integrated parallel bar according to the present invention. In the figure, the front wheel 63 is shown in greater detail. The wheel includes an axle 64. An attachment stub 69 projects upwardly from the drive assembly and is adapted to engage with the base frame. The stub and base frame are secured by means of a pin 61. The base frame and stub may be apertured in such way that the relative height of the walker is adjusted by placing the pin in any of a series of such apertures. An outlet box 62 is provided in the drive assembly as a point for supplying a charging and/or driving current to an electric motor within the drive assembly. Large plugs and switches are provided for easier independent use by neurological patients.

Figure 3:
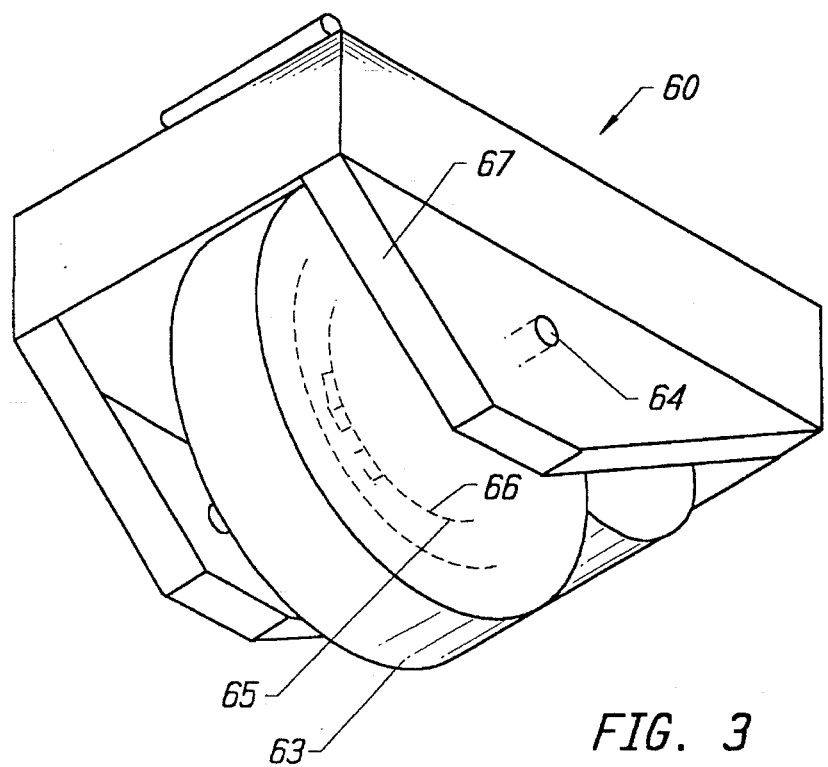
FIG. 3 is a second perspective view of a drive assembly for a powered walker device having an integrated parallel bar according to the present invention.

FIG. 3 is a second perspective view of the drive assembly 60. In the figure, a bracket 67 is shown receiving and supporting the front wheel axle 64. The figure also shows a drive belt 65 and a drive sprocket or pulley 66. While the exemplary embodiment of the invention uses a standard pulley and belt drive, a chain or direct drive arrangement may also be used.

Figure 4:
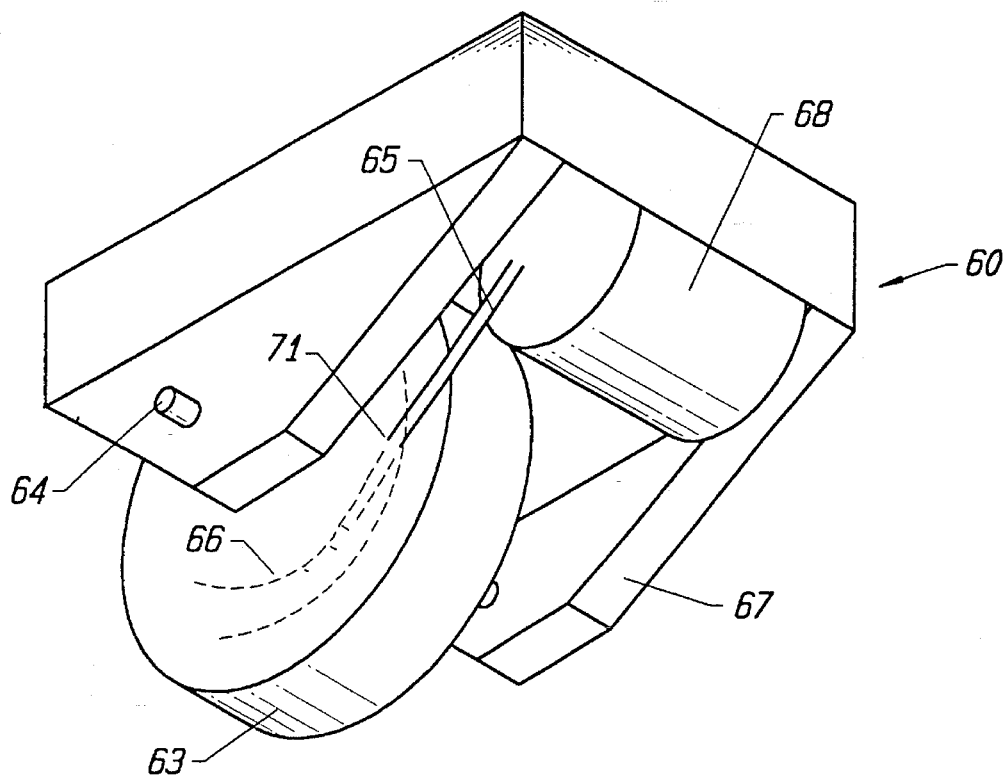
FIG. 4 a third perspective view of a drive assembly for a powered walker device having an integrated parallel bar according to the present invention.

FIG. 4 is a third perspective view of the drive assembly 60. In the figure, an electric motor 68 is shown coupled to the front wheel 63 via the drive belt 65. A reduction or gear assembly 71 may also be included if desired. The electric motor should be of sufficient strength to operate the device. A ¼ HP motor is used in the preferred embodiment of the invention. A gel-type battery is used to power the walker in the preferred embodiment of the invention, rather than an automotive-type liquid electrolyte battery, because gel-type batteries will not spill a caustic fluid should the device be upset.

Figure 5:
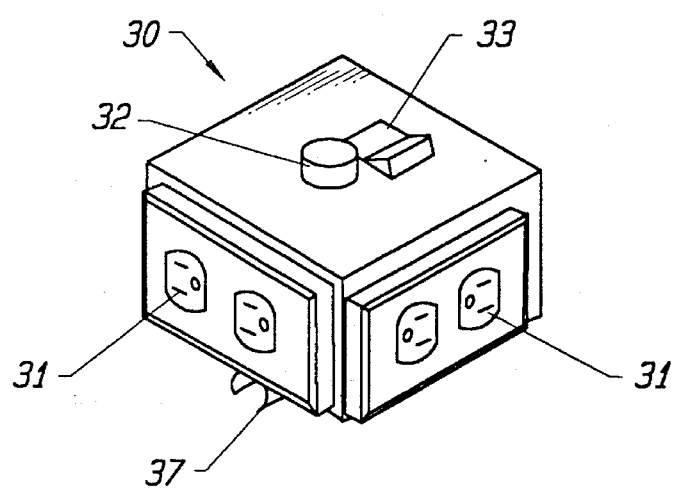
FIG. 5 is a perspective view of a control assembly for a powered walker device having an integrated parallel bar according to the present invention.

FIG. 5 is a perspective view of a control assembly 30 for a powered walker device having an integrated parallel bar according to the present invention. A person who has cerebral palsy does not and never can have fine motor dexterity. The invention includes a user interface, consisting of a large and sturdy motion switch 33 and speed control switch 32, and plugs 31 that are easily used by a disabled individual and that can withstand heavy use. For example, while a smaller speed control knob might be more attractive, it is functionally useless for the intended application. It is unfortunate that many devices for the disabled are designed with an attitude that they can learn how to use it. The invention is preferably implemented in a way that meets the human need, and that does not try to redesign the human.

The preferred embodiment of the invention takes into account the fact that no two people who have such disabilities, such as cerebral palsy, have the same set of motor skills, except that in all cases their body motions are jerking and imprecise. It is therefore preferred to produce the invention in a modular format to facilitate adaptability of the device for each user's unique needs. For example, the figures show a push-button switch that is used to activate the motor. In some embodiments of the invention, the push-button switch can be quickly replaced with a trigger switch, a photo cell, or any other type of switch. This is one of the reasons there are so many plugs and jacks incorporated into the invention. The switches are preferably attached to the invention with a C-type clamp 37, instead of being directly mounted to the frame. The use of a C-clamp lets the end user to place the switches at the best possible location.

Figure 6:
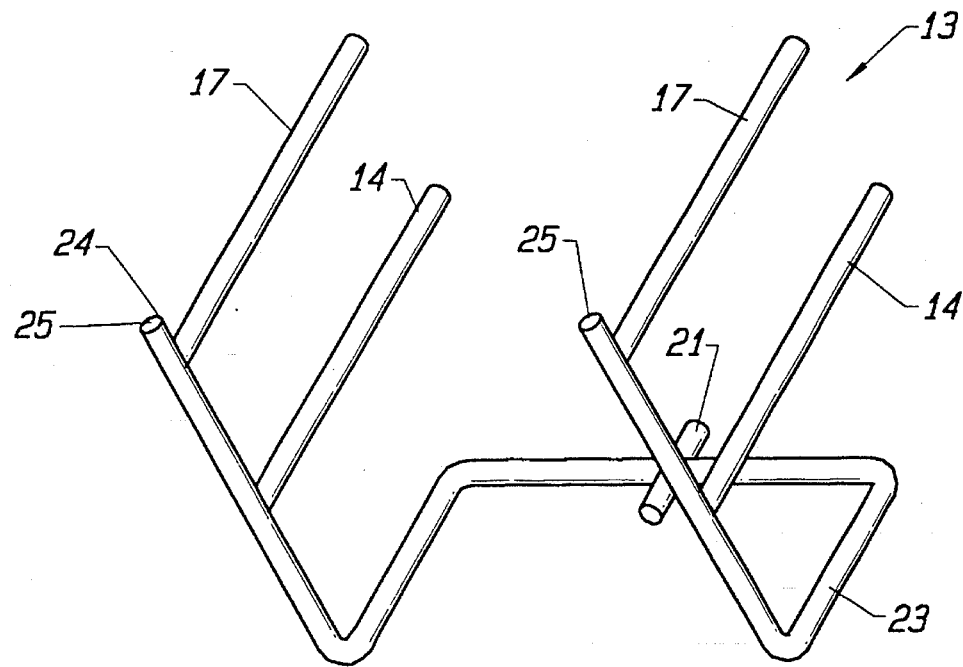
FIG. 6 is a perspective view of a base frame for a powered walker device having an integrated parallel bar according to the present invention.

FIG. 6 is a perspective view of a base frame 13 for a powered walker device having an integrated parallel bar according to the present invention. The base frame includes a first set of upright projections 19 that are adapted to receive a plurality of weights (discussed above), and includes a second set of projections 17. Both sets of projections terminate at, and provide support for, the platform 40 (discussed above). The base frame also include a yoke portion 21 that is adapted to receive the first frame 26 in such fashion that the first frame is freely rotatable within the yoke to allow the first frame to steer the front wheel. The base frame also provides a base 23 for the walker. A rear portion 25 of the first frame includes a pair of apertures 24 that are adapted to receive the rear wheel axles. The base frame is preferably made of 1-inch pipe or other such material.

Figure 7:
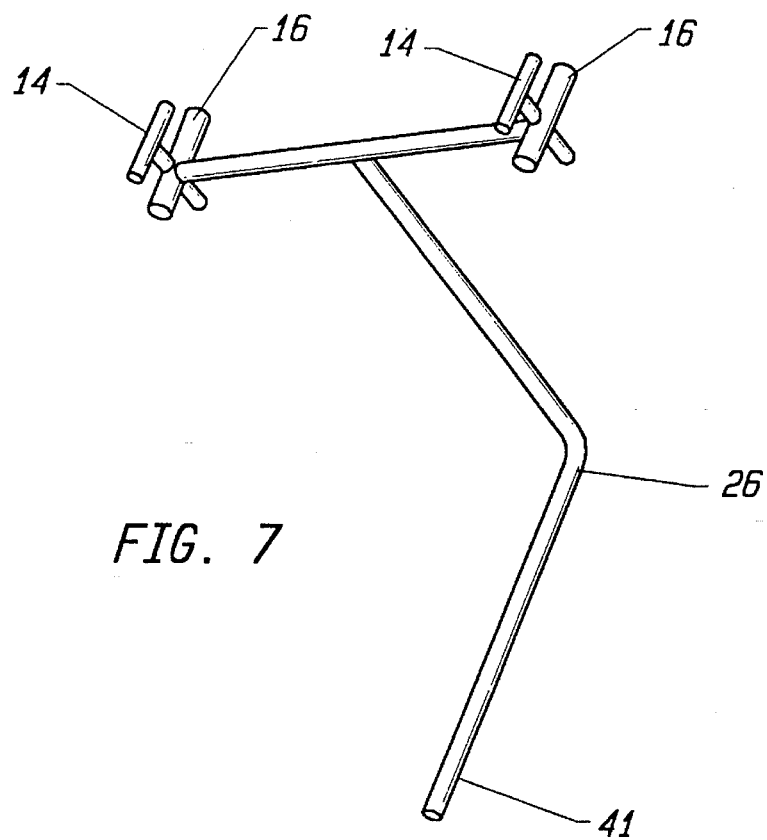
FIG. 7 is a perspective view of a first frame for a powered walker device having an integrated parallel bar according to the present invention.

FIG. 7 is a perspective view of a first frame section 26 for a powered walker device having an integrated parallel bar according to the present invention. The first frame section includes an apertured portion 41 that is adapted to engage with the motor assembly 60, as discussed above. The first frame section is preferably made of metal pipe that has an outer diameter that is less than the inner diameter of the pipe from which the base frame is made. In this way, the first frame end portion 41 may be inserted through the base frame yoke 21 be coupled to the drive assembly 60 to effect steering of the walker, as discussed above.

Figure 8:
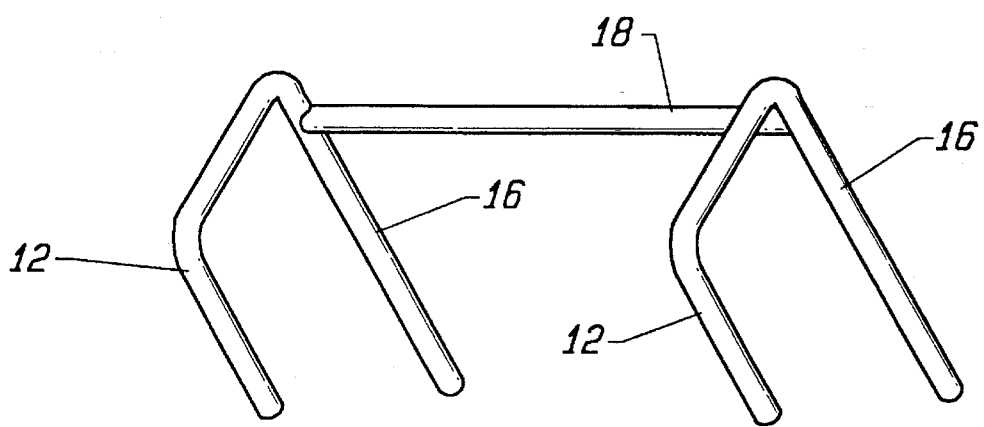
FIG. 8 is a perspective view of a grip for a powered walker device having an integrated parallel bar according to the present invention.

FIG. 8 is a perspective view of a grip 12 for a powered walker device having an integrated parallel bar according to the present invention. Each person having neurological limitations has his own way of grasping. The hand grips provided by the invention are in the shape of an upside-down L. The user can grasp the handles in either of a vertical or an horizontal orientation. The grip in the preferred embodiment of the invention is made from standard 1-inch tubing, such that each end-user may easily and affordably customize the handles to meet their needs. Better balance and coordination result form the unique handle arrangement provided by the invention because the user need not be overly concerned with walker etiquette, such as hand placement.

The invention is designed for those individuals suffering from such neurological problems as cerebral palsy, stroke victims, those having some stages of multiple sclerosis, and traumatic injury patients. The invention allows a user to engage in rehabilitative and therapeutic exercises, while performing the activities of normal living. The invention is especially beneficial for those disabled individuals who can not progress beyond parallel bars. For example, the invention provides a power walker for a person in physical therapy that is used as a portable parallel bar to aid the transition from a parallel bar to a walker. The invention provides the stability of hand rails with the mobility of a walker. While other powered walkers are known (see the discussion above), none addresses both the stability and mobility needs of disabled individuals, such as those with cerebral palsy.

One feature of the invention recognizes the fact that many people find it difficult to exercise, even if such exercise if beneficial. This is especially true of exercises prescribed by a therapist for disabled persons because such exercises are typically solitary, and not shared, activities. For example, although one can easily find a jogging partner, it is very unlikely that one can find a companion to share knee bending exercises. In addition, following a course of therapy has the psychological effect of saying to oneself, "I'm still ill," and tends to promote a self image of being different and isolated from others.

The invention is intended to integrate exercise with the activities of normal everyday life. Using the invention one walks on their own from place to place to perform everyday tasks, and not merely to engage in exercise. Sitting in a wheelchair, particularly a motorized wheelchair, does not provide a disabled individual with sufficient physical activity. As mentioned above, it is difficult to become highly motivated about performing therapeutic exercises. The invention provides a disabled person with vigorous, healthful physical activity without the stigma of therapy.

The standard progression for people recovering from a stroke is from the parallel bars to a walker. Most people experience shear fear when leaving the security of parallel bars to attempt a step with a walker. The invention is a valuable tool for aiding one's transition from parallel bars to a conventional walker.

Another consideration in producing the invention is that the walker should be cost effective. Accordingly, it is preferred that the invention be produced from readily available, inexpensive, standard parts. Accordingly, in the preferred embodiment of the invention the only part that cannot be obtained from a local supplier is the motor drive. Because standard parts are used, production costs are minimal. Most medical devices, i.e. a power wheelchair, use nonstandard plugs, switches, nuts, and bolts. Thus, the user becomes dependent on one vendor and is captive to whatever price that vender may want to charge, even if such price is beyond all reason. For the user of the invention—a person who is must bear both his physical disability and the enormous financial burden associated with his health care—such standardization means that inexpensive replacement parts are readily available.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A walker device for the disabled, comprising:

a base frame including an upwardly projecting yoke and at least two upwardly projecting frame members;

a drive assembly including an electric motor, a front drive wheel, and means for coupling said electric motor to said front drive wheel;

an adjustable parallel bar grip assembly coupled via said base frame yoke to said drive assembly and adapted to pivot said drive assembly to steer said walker device;

two rear wheels rotatably affixed to said base frame;

means for controlling operation of said electric motor;

weight means having apertures formed therethrough and removably engaged with said at least two upwardly projecting frame members via said apertures for counterbalancing said walker; and a platform affixed to said base frame at a terminal point of said at least two upwardly projecting frame members;

wherein said walker device has a low center of gravity and thereby provides a parallel bar grip against which a disabled person may pull himself up without tipping said walker device over.

2. The device of claim 1, wherein said means for coupling said electric motor to said front wheel drive comprises a first pulley associated with said electric motor, a second pulley associated with said front wheel, and a drive belt connected therebetween.

3. The device of claim 1, further comprising:

means for adjusting said parallel bar grip assembly.

4. The device of claim 3, wherein said adjusting means comprises at least two sets of apertures formed through said parallel bar grip assembly and at least two pins that are adapted for insertion into said apertures to secure said parallel bar grip assembly at a selected position.

5. The device of claim 1, said electric motor controlling means further comprising:

a motor operation control; and a motor speed control.

6. The device of claim 1, further comprising:

hand grips that are designed to allow various hand positions.

7. The device of claim 1, further comprising:

a modular control assembly adapted to permit the rearranging and interchanging of user assembly controls.

* * * * *